June 24, 1952 E. H. HUGENHOLTZ 2,601,436

FREQUENCY CONTROL APPARATUS

Filed Feb. 11, 1949 2 SHEETS—SHEET 1

INVENTOR.
EDWARD HERMAN HUGENHOLTZ
BY Fred M Vogel
AGENT.

June 24, 1952 E. H. HUGENHOLTZ 2,601,436

FREQUENCY CONTROL APPARATUS

Filed Feb. 11, 1949 2 SHEETS—SHEET 2

INVENTOR
EDUARD HERMAN HUGENHOLTZ
BY Fred M Vogel
AGENT

Patented June 24, 1952 2,601,436

UNITED STATES PATENT OFFICE 2,601,436

FREQUENCY CONTROL APPARATUS

Eduard Herman Hugenholtz, Eindhoven, Netherlands, assignor to Hartford National Bank and Trust Company, as trustee, Hartford, Conn.

Application February 11, 1949, Serial No. 75,805
In the Netherlands April 17, 1948

13 Claims. (Cl. 250—36)

Figure 1:
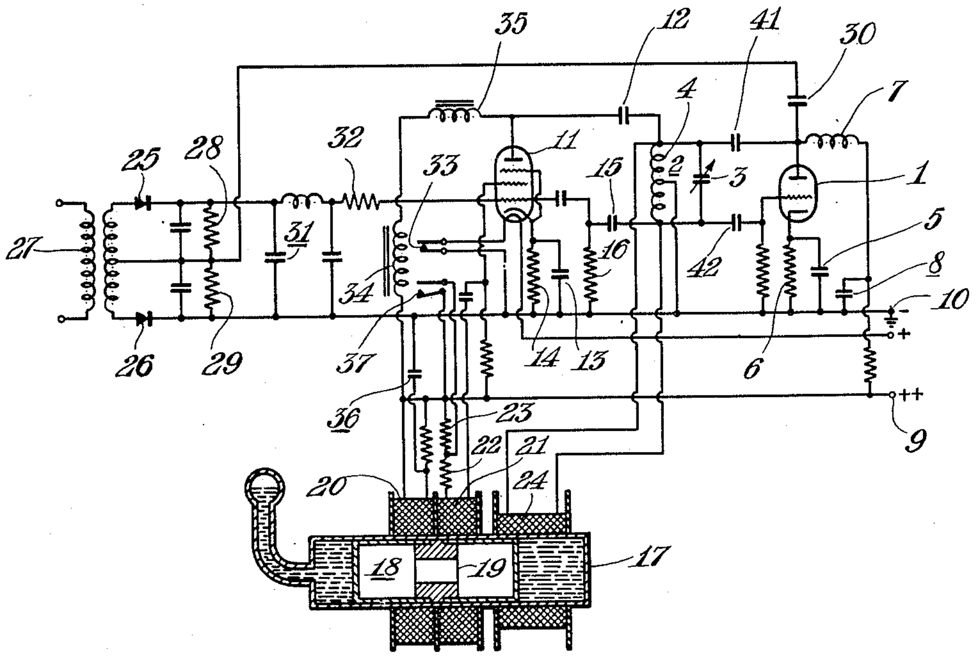

This invention relates to oscillators comprising means for automatic frequency correction (AFC) on a control voltage.

For automatic frequency correction of an oscillator it is known to couple the frequency-determinating circuit of the oscillator of two frequency correctors, of which one is realised as an electronic frequency corrector, for example as a reactance tube circuit, and serves for rapid correction of comparatively small frequency deviations, whereas the other frequency corrector comprises a mechanically movable control member and serves to correct comparatively great frequency deviations, the last-mentioned frequency corrector not being active with small frequency variations on account of its mechanical inertia.

The generation of the AFC-voltages for the two frequency correctors requires the use of discriminators exhibiting different ranges which are matched to the control ranges of the frequency correctors to be controlled, that is to say the maximum variation of the AFC-voltage in the case of the discriminator for the electronic frequency corrector takes place within a frequency range which is small (for example $\frac{1}{10}$) as compared with corresponding range of the other discriminator.

When the two AFC-circuits are of the conventional construction, material difference in control sensitivity is inherent in the greatly different control ranges, the AFC-circuit comprising the electronic frequency corrector having a comparatively small control range but a comparatively high control sensitivity, which is beneficial to the ultimate stabilisation.

It is known to win the AFC-voltage required for quick-action frequency correctors within a very narrow range of frequencies by means of a so-called beat discriminator, viz. by mixing of the control and oscillator voltages. The other AFC-voltage may be derived either from a frequency detector known per se comprising interconnected, tuned oscillatory circuits (so-called tuned discriminator) or, for example, from a so-called rotary-field discriminator of the type described in, for example, American patent specification No. 2,044,749 or French patent specification No. 920,599.

The object of the invention is to provide a novel arrangement of circuits of the described type comprising two frequency correctors designed for different control ranges, which, whilst retaining the control sensitivity, results in a circuit-arrangement which is more advantageous in technical respect and which may ultimately be made cheaper than the aforementioned arrangements.

According to the invention, in circuit-arrangements of the type under consideration which comprises two frequency correctors it suffices to utilise a discriminator circuit which is matched to the narrow control range of the electronic frequency corrector, which discriminator circuit substantially provides a direct voltage upon stabilisation of the oscillator voltage on the control voltage and which substantially provides an alternating voltage with greatly different oscillator and control voltage frequencies by the use of means which become active in the absence of the desired stabilisation and more particularly of an AFC-direct voltage and which, as a result of shift of the operating point of the second frequency character, cause the control range thereof to be scanned.

It is observed that AFC-circuits are known comprising a beat discriminator and an electronic frequency corrector in the form of a reactance tube, in which, in order to ensure locking in of the AFC-control, a voltage pulse is supplied to the control grid of the reactance tube when the AFC-circuit is switched-in, this in order to bring about "scanning" of the control range of the frequency corrector. As a matter of course, as a rule only a portion of the maximum available control range of the reactance tube is controlled by the output voltage of the discriminator. In the circuit-arrangement according to the invention the maximum AFC-voltage and the control range of the frequency corrector may be exactly matched to one another in favour of the control sensitivity.

The means for shifting the operating point of the second frequency corrector comprise an auxiliary generator which provided an auxiliary alternating current having a frequency of which a half period is greater than the period of time required to traverse the control range of the second frequency corrector.

The reactance tube provided in the first frequency corrector may serve as the auxiliary generator tube.

In a further particularly advantageous embodiment, the auxiliary generator tube is constituted by a discharge tube which is included in the supply lead to a control electrode of the oscillator tube and which also serves as the first frequency corrector by utilising it as a variable leak resistance.

In this connection it is observed that it is known per se to control the frequency of oscillations generated by an oscillator with the use of a discharge tube which is controlled by a control voltage and which is included as a variable leak resistance in the grid lead of the oscillator (vide Belgian patent specification No. 458,146).

In order that the invention may be clearly understood and readily carried into effect, it will now be described more fully by reference to the accompanying drawing.

Figure 2:
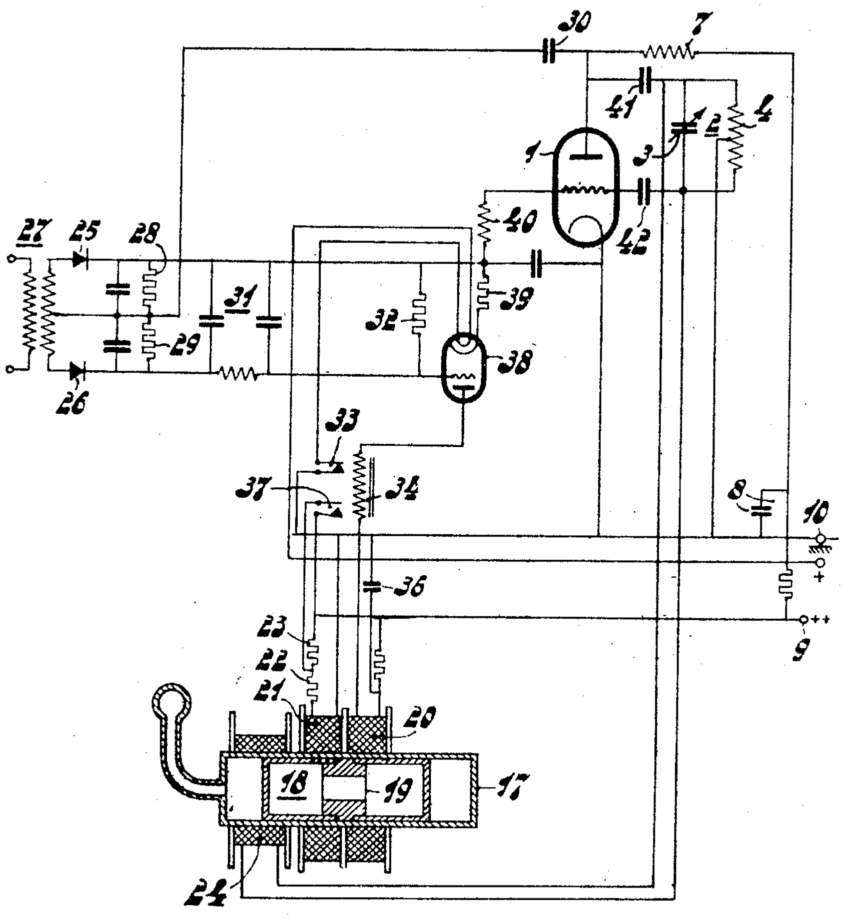

Fig. 1 shows a device according to the invention which comprises an electronic frequency corrector in the form of a reactance tube, whereas in the embodiment shown in Fig. 2 the electronic frequency corrector used in a discharge tube connected as a variable leak resistance.

In Fig. 1, reference numeral 1 designates a triode which is used as an oscillator tube and of which the anode and the control grid are connected by way of coupling condensers 41, 42 to the extremities of a frequency-determining oscillatory circuit 2 comprising a tuning condenser 3 and a circuit coil 4. The cathode is connected to earth by way of a cathode resistance 6 shunted by a condenser 5, a center tap on the circuit coil 4 being also connected to earth. The anode of the triode is connected by way of a choke 7 and a resistance-condenser circuit 8 serving for smoothing to the positive terminal 9 of a source of anode supply of which the negative terminal 10 is connected to earth.

The frequency-determining oscillatory circuit 2 of the oscillator 1—4 is connected to two frequency correctors, of which one is realised as a reactance tube circuit and serves for quick correction of small frequency deviations, whereas the other frequency corrector comprises a mechanically movable control member and serves to correct fairly great frequency deviations.

The anode of the pentode 11, which is used as a variable reactance, is connected by way of a coupling condenser 12 to an extremity of the frequency determining oscillatory circuit 2 to the oscillator 1—4, the cathode being connected to earth by way of a cathode resistance 14 shunted by a condenser 13 to obtain a suitable negative grid-bias. An alternating voltage derived from the frequency-determining oscillatory circuit 2 of the oscillator 1—4 is supplied to the control grid of the reactance tube 11 by way of a phase-shifting network comprising a condenser 15 and a resistance 16. The tapping point of this network is capacitively coupled to the control grid of the reactance tube 11. Such a reactance tube circuit is active as a reactance the value of which is adjustable by a control voltage.

The reactance tube circuit is realised in such manner that maximum control sensitivity is obtained, but in this case a comparatively small control range may only be realised.

The second frequency corrector used for the correction of fairly great frequency deviations comprises a metallic control member 18, which is shaped in the form of a hollow piston movable in the axial-direction in a glass tube 17 filled with liquid, said control member comprising a central annular core 19 of soft iron. The glass tube is surrounded by two energising coils 20, 21, coil 21 being connected to the anode supply terminals 9, 10 by way of two resistances 22, 23 connected in series and coil 20 being traversed by an energising current dependent on the AFC-control voltage. The control member 18 will move to the left or to the right according to the value of the currents traversing the energising coils 20, 21. The movement of the right-hand extremity of the control member 18 varies the inductance of a control coil 24 surrounding the tube and connected parallel to the oscillatory circuit coil 4 or a part thereof in that the control member 18 acts upon the magnetic reluctance of the coil field. The control coil 24 is preferably decoupled magnetically with respect to the energising coils 20, 21 provided for movement of the control member 18, in order that upon variations in the currents traversing the coils 20, 21, interfering currents induced in the control coil 24 may be avoided.

According to the invention, in the circuit-arangement shown it suffices to use a discriminator which is matched to the narrow control range of the electronic frequency corrector without the catching range of the circuit being influenced to a troublesome extent. Use is made of a discriminator circuit which substantially provides a direct voltage upon stabilisation of the oscillator voltage on the control voltage and substantially provides an alternating voltage of difference frequency with different oscillator and control voltage frequencies, the discriminator circuit being realised in the form of a push-pull mixing circuit used as a beat discriminator.

The push-pull mixing circuit comprises two rectifiers 25, 26, which are connected, on the one hand, to the extremities of the secondary winding of a push-pull transformer 27, and, on the other hand, interconnected by way of the series-connection of two equal output resistances 28, 29 shunted by condensers. The oscillator voltage is supplied by way of a coupling condenser 30 to the junction of the resistance 28, 29, which is connected to the center tap of the secondary winding of the transformer 27. When a control oscillation is supplied to the primary winding of transformer 27, an AFC-voltage set up across the output impedance 28, 29 of the push-pull mixing circuit is supplied, by way of a low-pass filter 31 and a resistance 32, to the control grid of the pentode 11 which is connected as a variable reactance.

With synchronism of the control and oscillator voltages, an AFC-voltage is set up at the low-pass filter 31, the value and polarity of which vary with the value and polarity of the phase-difference between the two oscillations.

In order to ensure locking in of the AFC-circuit in the absence of the desired stabilisation, that is to say in the absence of a AFC-direct voltage, provision is made of means which, due to shift of the operating point of the second frequency corrector, cause the control range thereof to be scanned.

The means for shifting the operating point of the second frequency corrector comprise an auxiliary generator which supplies an auxiliary alternating current having a frequency of which a half period is greater than the period of time required for traversing the control range of the second frequency corrector.

The pentode 11, which is connected as a variable reactance, is used for generating the auxiliary alternating current. To this end a rest contact of a maximum relay 34 is included in series with the heating current circuit, the energising winding of the said relay being included in the anode circuit of the pentode 11. The anode of the pentode 11 is connected by way of a choke 35, the energising winding of the relay 34, the energizing coil 20 of the second frequency corrector and a smoothing filter 36 to the positive terminal 9 of the anode voltage supply.

At a certain value of the anode current of the pentode 11, the maximum relay 34 is responsive and the rest contact 33 interrupted, which results in the filament being cooled. The maximum relay 34 is de-energized with retardation and the rest contact 33 is again closed, whereafter the anode current again slowly increased until the rest contact 33 is again interrupted, etc. The arrangement described, making use of thermal inertia, thus permits of generating alternating current of very low frequency (for example from 1/5 to 1/10 cycle/sec.) of which a half period is larger than the period of, say, 5 seconds which is required for traversing the control range of the second frequency corrector. No requirements whatever are imposed upon the frequency stability of the generated alternating current, provided the aforementioned condition is fulfilled.

When the discharge tube 11 is switched-in, the current traversing the energising coil 20 has a value higher than that of the current for energising the coil 21 and will thus bring about movement of the control member 18 to the left-hand side. When the discharge tube 11 is switched-off, the current traversing coil 20 decreases and the higher energizing current of coil 21 will cause the control member to be moved to the right and the control range of the second frequency corrector to be traversed completely. In order to reduce this "time of return," resistance 23 is shunted by a working contact 37 of relay 34.

The negative grid-bias of the pentode 11 is chosen to be such that with different oscillator and control voltage frequencies the current flowing through the energizing coil 20 is substantially independent of the AFC-alternating voltage then supplied to the tube, whereas with synchronism of the two oscillations the anode current, as a result of an AFC-direct voltage of negative polarity, may considerably decrease and drop substantially to zero.

If the starting point is constituted by the position at which the arrangement is switched-in, the operation thereof is as follows. The rest contact 33 and the working contact 37 of the relay 34 in the switched-off position are closed and open respectively, the oscillator and control oscillation frequencies being different. It is assumed that the control member 18 upon switching-in approximately occupies its central position. Switching-in the discharge tube 11 causes the control member 18 to be moved to the extreme left-hand side. If in the meantime synchronism between the oscillator and control voltages does not occur, the relay 34 is energised with the result that the rest contact 33 is opened and the working contact 37 is closed. Any positive AFC-voltage occurring causes quicker reponse of the relay 34. The control member 18 then rapidly moves to the extreme right-hand side, the complete control range being traversed before the control member 18 again starts to move to the left as a result of the de-energisation of the maximum relay. If during the movement to the right, as a result of short-period synchronism between the oscillator and control voltages, an AFC-voltage is supplied to the tube 11, this remains without effect due to the tube being switched-off. If synchronism between the oscillator and control voltages occurs during the movement of the control member to the left, the beat discriminator provides an AFC-direct voltage of negative polarity such that the current flowing through the energising coil 20 decreases and the control member remains in the position desired for synchronism, while the anode current of the tube 11 which is now limited by the AFC-voltage is insufficient to energise the maximum relay 34. The position is thus stable. Slow frequency variations of the oscillator voltage with respect to the control oscillation will now be further followed by the two frequency correctors and rapid variations will be followed only by the reactance tube circuit.

The device according to the invention shown in Fig. 2 differs from the arrangement shown in Fig. 1 in the construction of the electronic frequency corrector. Identical elements are indicated by the same reference numerals.

In the embodiment shown in Fig. 2, the supply lead to the control grid of tube 1 includes a triode 38 which is used as an electronic frequency corrector and which comprises a cathode resistance 39 and a choke 40. The triode 38 constitutes a grid leak for the tube 1.

The frequency of the oscillations generated by the tube 1 may be controlled by varying the internal resistance of the tube 38 as a function of a control voltage supplied by way of the low-pass filter 31 to the control grid of triode 38 which is connected by way of a leak resistance 32 to the cathode.

The influence exerted by the direct grid-current upon the generated oscillator frequency is facilitated by utilising a small grid condenser 42 with the oscillator tube 1.

The tube 38 is adjusted in such manner that maximum control sensitivity is obtained, but in this case a comparatively small control range may only be realised.

For generating the auxiliary alternating current which in the absence of the desired stabilisation due to shift of the operating point of the second frequency corrector causes the control range thereof to be scanned, a rest contact 33 of a maximum relay 34 is included in series with the heating-current circuit of tube 38, the winding for energising the said relay being included in the anode circuit of the tube 38.

The anode of the tube 38 is connected by way of the winding for energising the relay 34, a coil 20 for energising the second frequency corrector and a smoothing filter 36 to the positive terminal 9 of the anode voltage supply.

In this connection it is observed that the positions of the energising coils 20, 21 are changed with respect to the embodiment shown in Fig. 1. When the tube 38 is switched-off, the energising current traversing coil 21 will cause the control member to move to the left-hand side.

The operation of the circuit arrangement shown in Fig. 2 essentially corresponds to the device shown in Fig. 1.

In addition to the method of scanning the control range as used in the described circuit, still other methods are possible. Thus, it is possible to provide change-over contacts at the extremities of the glass tube, which contacts are reversed by the control member of the second frequency corrector. A further possibility consists in the use of a multivibrator circuit for generating the alternating current of low frequency.

What I claim is:

1. Automatic-frequency-control apparatus for effecting synchronism between the wave produced by an oscillation generator and a source of control oscillations, comprising means to combine said wave and said control oscillations to produce a control voltage which in the condition where the frequencies are in synchronism is unidirectional and in the condition where the frequencies differ is alternating at a rate corresponding to the frequency difference, a first electronic frequency corrector coupled to said generator and responsive to said control voltage to vary the frequency of said generator within a predetermined control range in a direction and to an extent effecting frequency synchronism between said wave and said control oscillations, a second frequency corrector coupled to said generator to vary the frequency thereof within a control range which is wide relative to said predetermined range, and means activating said second corrector in the absence of synchronism between said control oscillations and said wave to scan the control range thereof periodically.

2. An arrangement, as set forth in claim 1, wherein said first corrector is constituted by a reactance tube.

3. An arrangement, as set forth in claim 1, wherein said second corrector comprises a liquid-filled tube, a control member movably disposed within said tube and having a portion thereof formed of ferromagnetic material, electromagnetic means for shifting said member in accordance with an applied control potential, and a coil surrounding said tube at a position at which the inductance thereof depends on the position of the member relative thereto, said coil being coupled to said generator to vary the operating frequency thereof.

4. Automatic-frequency-control apparatus for effecting synchronism between the wave produced by an oscillation generator and a source of control oscillations, comprising means to combine said wave and said control oscillations to produce a control voltage which in the condition where the frequencies are in synchronism is unidirectional and in the condition where the frequencies differ in alternating at a rate corresponding to the frequency difference, a first electronic frequency corrector coupled to said generator and responsive to said control voltage to vary the frequency of said generator within a predetermined control range in a direction and to an extent effecting frequency synchronism between said wave and said control oscillations, a second frequency corrector coupled to said generator to vary the frequency thereof and provided with a movable control member responsive to an applied control potential, said second corrector having a wide control range relative to said predetermined range, means to produce a periodic control potential in the condition where the frequencies of said wave and said control oscillations differ, and means to apply said periodic control potential to said second corrector to effect scanning of the control range thereof.

5. Automatic-frequency-control apparatus for effecting synchronism between the wave produced by an oscillation generator having a resonant circuit and a source of control oscillations, comprising discriminator means to combine said wave and said control oscillations to produce a control voltage which in the condition where the frequencies are in synchronism is unidirectional and in the condition where the frequencies differ in alternating at a rate corresponding to the frequency difference, a first electronic frequency corrector coupled to said generator and responsive to said control voltage to vary the frequency of said generator in a direction and to an extent effecting frequency synchronism between said wave and said control oscillations, said first corrector having a predetermined control range, a second frequency corrector coupled to said generator to vary the frequency thereof and provided with a control member responsive to an applied control potential and movable within an inductor coupled to said resonant circuit, said second corrector having a wide control range relative to said predetermined range, means responsive to the absence of a unidirectional control voltage to produce a periodic control potential, and means to apply said periodic control potential to said second corrector to effect scanning of the control range thereof.

6. An arrangement, as set forth in claim 5, wherein said control member effects scanning of the control range of the second corrector within a predetermined time interval and wherein said periodic control potential is supplied by an auxiliary generator producing an alternating current having a frequency of which a half period is greater than said time interval for scanning.

7. An arrangement, as set forth in claim 6, wherein said auxiliary generator includes an electron discharge tube provided with a filament and an anode, a relay having an energizing coil and a normally closed switch actuated thereby, means to feed heating current through said switch to said filament, and means to apply a constant potential through said coil to said anode, whereby when anode current attains a predetermined value said switch is opened to render said tube inoperative.

8. Automatic-frequency-control apparatus for effecting synchronism between the wave produced by an oscillation generator provided with a frequency determining circuit and a source of control oscillations, comprising a beat frequency discriminator to combine said wave and said control oscillations to produce a control voltage which in the condition where the frequencies are in synchronism is unidirectional and in the condition where the frequencies differ in alternating at a rate corresponding to the frequency difference, a first electronic frequency corrector including a reactance tube across said frequency determining circuit and responsive to said control voltage to vary the frequency of said generator within a predetermined control range in a direction and to an extent effecting frequency synchronism between said wave and said control oscillations, said reactance tube including a cathode, a grid and an anode, the output of said discriminator being applied to said grid, a second frequency corrector coupled to said generator to vary the frequency thereof and provided with a movable control member responsive to an applied control potential, said second corrector having a wide control range relative to said predetermined range, means responsive to the absence of said unidirectional control voltage to produce a periodic control potential, and means to apply said periodic control potential to said second corrector to effect scanning of the control range thereof.

9. An arrangement, as set forth in claim 8, wherein said means to produce a periodic control potential includes said reactance tube and means to render said tube periodically operative.

10. Automatic-frequency-control apparatus for effecting synchronism between the wave produced by an oscillation generator provided with a frequency determining circuit and a source of control oscillations, comprising a beat frequency discriminator for combining said wave and said control oscillations to produce a control voltage which in the condition where the frequencies are in synchronism is unidirectional and in the condition where the frequencies differ in alternating at a rate corresponding to the frequency difference, a first electronic frequency corrector including a reactance tube coupled to said frequency determining circuit and responsive to said control voltage to vary the frequency of said generator within a predetermined control range in a direction and to an extent effecting frequency synchronism between said wave and said control oscillations, said reactance tube having a filament, a cathode, a grid and an anode, the output of said discriminator being applied to said grid, a second frequency corrector coupled to said generator to vary the frequency thereof and provided with a liquid-filled tube, a movable control member having a ferromagnetic portion and being disposed within said tube, first and second energizing coils surrounding said tube and an inductance surrounding said tube and coupled to said frequency determining circuit, a relay having a normally closed switch, means to supply current to said filament through said switch, and a source of direct potential connected between said cathode and anode through said first coil and said relay, said second coil being connected across said source.

11. An arrangement, as set forth in claim 10, wherein said second coil is connected to said source through a resistance element, and wherein said relay further includes a normally open switch connected across a portion of said element.

12. Automatic-frequency-control apparatus for effecting synchronism between the wave produced by an oscillation generator and a source of control oscillations, said generator including an electron discharge tube having a cathode, a grid and an anode, and a grid bias circuit, the magnitude of bias on said grid determining the frequency of said generator, said apparatus comprising a discriminator to combine said wave and said control oscillations to produce a control voltage which in the condition where the frequencies are in synchronism is unidirectional and in the condition where the frequencies differ in alternating at a rate corresponding to the frequency difference, a first electronic frequency corrector coupled to said generator and responsive to said control voltage to vary the frequency of said generator within a predetermined control range in a direction and to an extent effecting frequency synchronism between said wave and said control oscillations, said first corrector including a grid-controlled electron discharge device interposed in the grid circuit of said generator tube, the output of said discriminator being applied to the grid of said device to vary the impedance thereof, a second frequency corrector coupled to said generator to vary the frequency thereof and provided with a movable control member responsive to an applied control potential, said second corrector having a wide control range relative to said predetermined range, means to produce a periodic control potential in the condition where the frequencies of said wave and said control oscillations differ, and means to apply said periodic control potential to said second corrector to effect scanning of the control range thereof.

13. An arrangement, as set forth in claim 12, wherein said means to produce a periodic control potential is constituted by an auxiliary generator including said electron discharge device and means to render said device periodically operative.

EDUARD HERMAN HUGENHOLTZ.

No references cited.